United States Patent [19]

Tanaka

[11] Patent Number: 4,472,898
[45] Date of Patent: Sep. 25, 1984

[54] FILE SEARCH APPARATUS

[75] Inventor: Norihito Tanaka, Osaka, Japan

[73] Assignee: Lihit Industrial Company Limited, Osaka, Japan

[21] Appl. No.: 378,601

[22] Filed: May 17, 1982

[30] Foreign Application Priority Data

May 25, 1981 [JP] Japan ................................. 56-78829
May 25, 1981 [JP] Japan ............................ 56-75380[U]

[51] Int. Cl.³ .......................................... B42F 17/34
[52] U.S. Cl. ....................................... 40/378; 40/377; 312/11; 312/97.1; 312/186
[58] Field of Search ................ 40/378, 371, 372, 375, 40/377, 379; 312/186, 11, 97.1, 197

[56] References Cited

U.S. PATENT DOCUMENTS 3,429,436  2/1969  Irasek .................................... 40/378
4,143,928  3/1978  Easton .................................. 312/186

FOREIGN PATENT DOCUMENTS 2318544 10/1973 Fed. Rep. of Germany .
497207  11/1970 Switzerland .
570891   7/1945 United Kingdom .
1112885  5/1968 United Kingdom .
1169832 11/1969 United Kingdom .
1298378 11/1972 United Kingdom .
1371930 10/1974 United Kingdom .

Primary Examiner—John J. Wilson
Assistant Examiner—Cary E. Stone
Attorney, Agent, or Firm—Stevens, Davis, Miller & Mosher

[57] ABSTRACT

A file search apparatus which is provided with a base having a center pillar, a reel which comprises file accommodating rooms accommodating therein a plurality of files having codes and juxtaposed in a circle and is supported to the center pillar rotatably therearound, a selection device which is supported revolvably to the base to revolve along the outer periphery of the reel so as to read the codes on the files and search for a desired file, a driving device for driving the selection device, and a search display means displaying the searched file, so that the reel rotates to move the searched file to a predetermined position to be taken out therethrough without the trouble of looking for the searched file around the reel.

12 Claims, 13 Drawing Figures

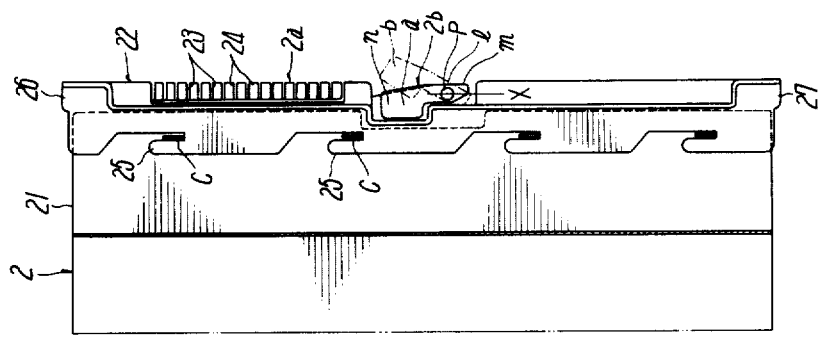
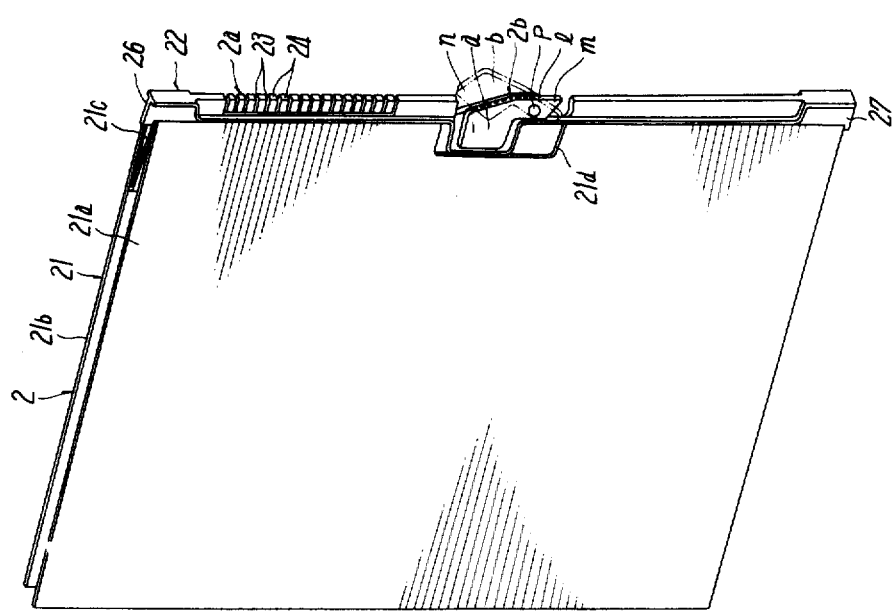

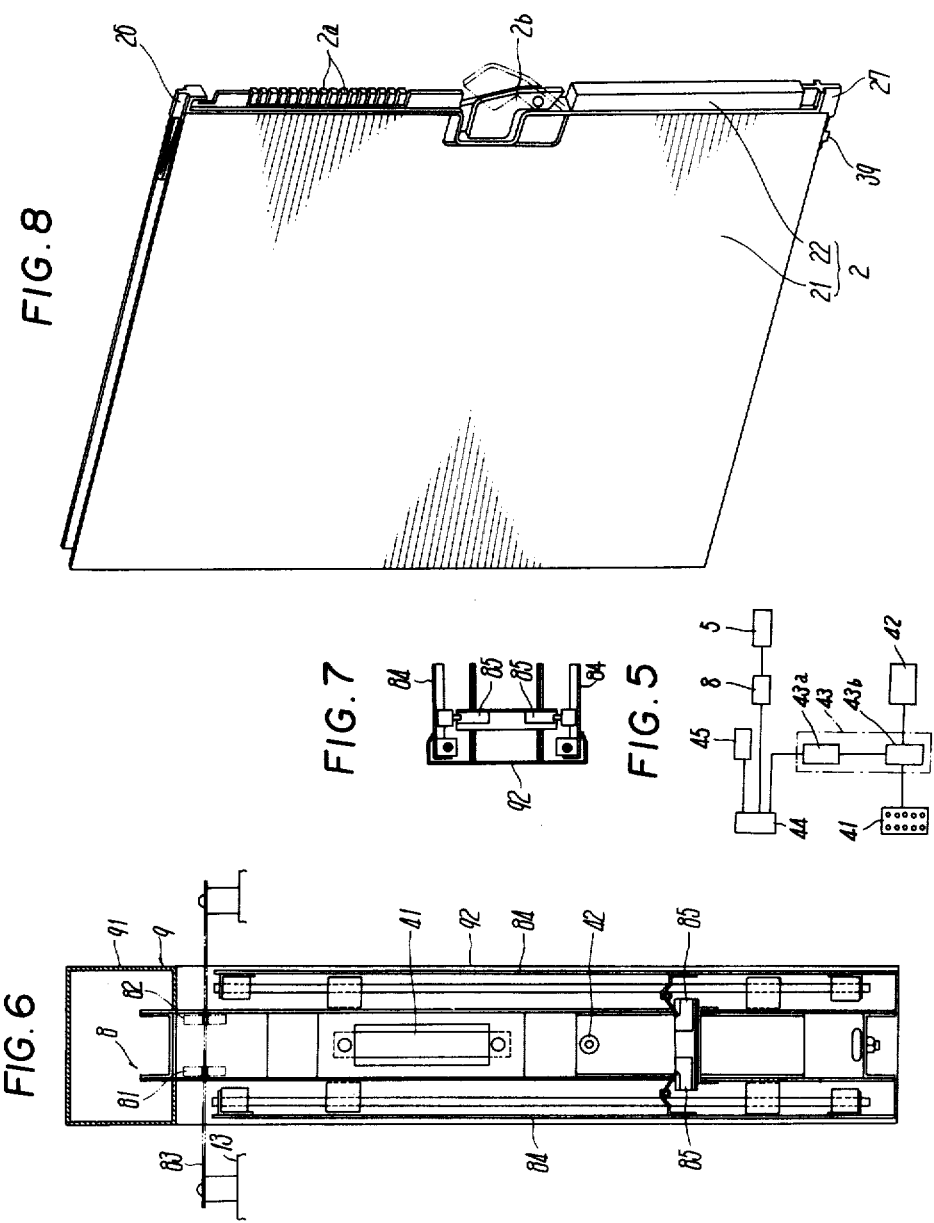

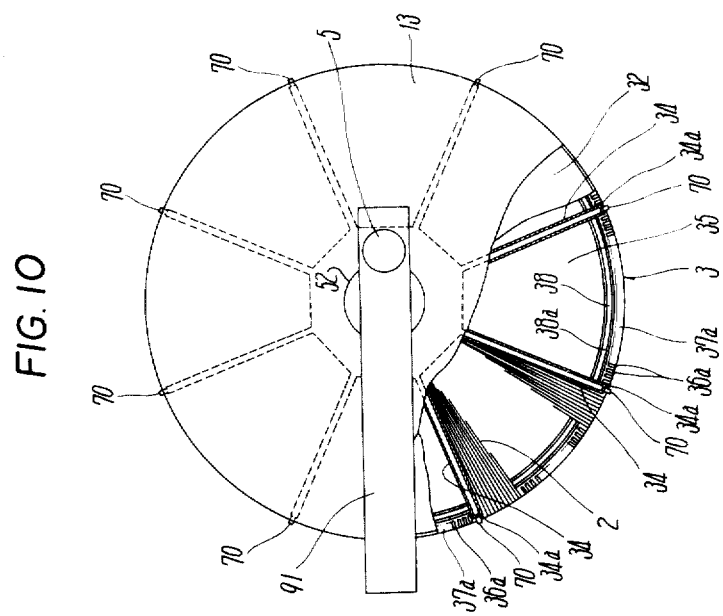
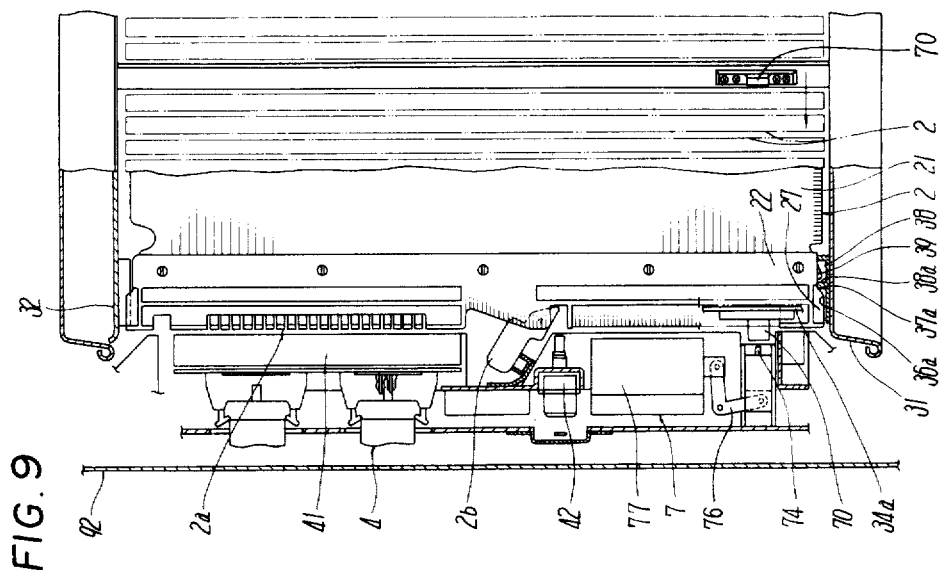

FILE SEARCH APPARATUS

FIELD OF THE INVENTION

This invention relates to a file search apparatus, and more particularly to a file search apparatus which accommodates a large number of files within a reel large enough to juxtapose them in a circle so that a selection device searches a desired one of the files automatically from the reel.

BACKGROUND OF THE INVENTION

Conventionally, this kind of file search apparatus has been well-known, which supports a reel to a base rotatably around a vertical shaft and a selection device notrotatably to the same, the reel being driven by a driving device so that the selection device searches a desired one of files accommodated in the reel.

Such apparatus, however, cannot determine the position where the searched file is taken out, so that a worker must look for the searched file around the reel, which is very troublesome for him and requires an extra space around the reel.

SUMMARY OF THE INVENTION

This invention has been designed in order to solve the above problem. An object of the invention is to provide a file search apparatus which is capable of readily taking out the searched file from the reel always at a fixed position and need not provide the extra space for looking for the file.

In detail, this invention is characterized in that the file search apparatus is provided with a base having a center pillar, a large number of files having codes, and a reel having rooms enough to accommodate therein the files juxtaposed in a circular arrangement and being rotatable around the center pillar, a selection device which circles along the outer periphery of the reel and reads the codes at each file to search a desired file, a driving device for driving the selection device, and a search display means which displays the desired file searched by the selection device.

The file search apparatus of the invention constructed as foregoing enables a worker to make certain of searching a file at a fixed position readily by virtue of rotation of the reel, whereby he need not walk around the reel and no extra space is required for looking for the searched file. Also, it is preferable to provide at each file a search display means, such as a search lever, which is swingably movable into or out with respect to the back of each file. Hence, the searched file can be taken out always reliably and simply by the lever and free from a contact resistance, even a large one, existing between the adjacent files.

Further objects and advantages of the present invention will be apparent from the following description, reference being had to the accompanying drawings wherein preferred embodiments of the invention are clearly shown.

BRIEF DESCRIPTION OF THE INVENTION

FIG. 1 is a longitudinally sectional view of an embodiment of a file search apparatus of the invention, FIG. 2 is a plan view of the FIG. 1 embodiment, FIG. 3 is a perspective view of a file, FIG. 4 is a front view of a principal portion of the file, FIG. 5 is a circuit diagram of electric parts, FIG. 6 is an enlarged sectional view taken on the line VI—VI in FIG. 1, FIG. 7 is a sectional view taken on the line VII—VII in FIG. 1, FIGS. 8 through 13 show a modified embodiment of the invention, in which FIG. 8 is a perspective view of a file having an engaging portion at the lower portion of a side-edge member at the file, FIG. 9 is an enlarged view explanatory of a relation between the file and a reel, FIG. 10 is a partially cutaway plan view showing the files accommodated in the reel, and FIGS. 11 through 13 are views explanatory of a relation between an engaging member in the reel and an association member in a selection device, in which FIG. 11 is a front view of the engaging member and association member, FIG. 12 is a sectional side view thereof, and FIG. 13 is an illustration of operation of the same.

DETAILED DESCRIPTION OF THE INVENTION

Figure 1:
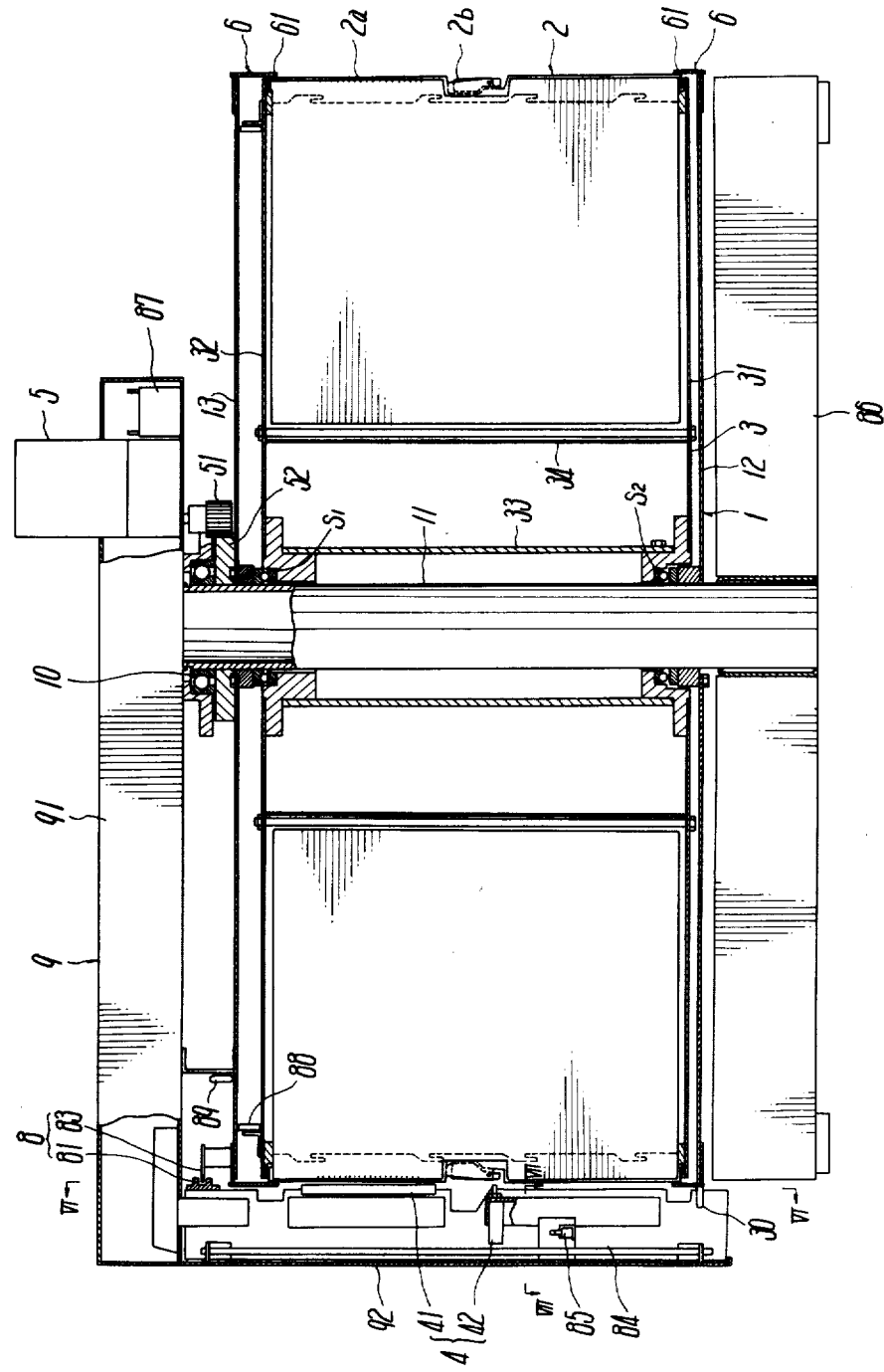

The file search apparatus of the invention basically comprises a base 1 having a tubular center pillar 11, a large number of files 2 each having codes 2a, a reel 3 having rooms 35 for accommodating therein the files 2 juxtaposed in a circle and being freely rotatable around the center pillar 11, a selection device 4 which is supported rotatably to the base 1 and circles around the reel 3 to read the codes 2a at each file 2 accommodated in the reel 3 and search a desired file 2, a driving device 5 for driving the selection device 4, and a search display means which displays the file 2 searched by the selection device 4.

Figure 2:
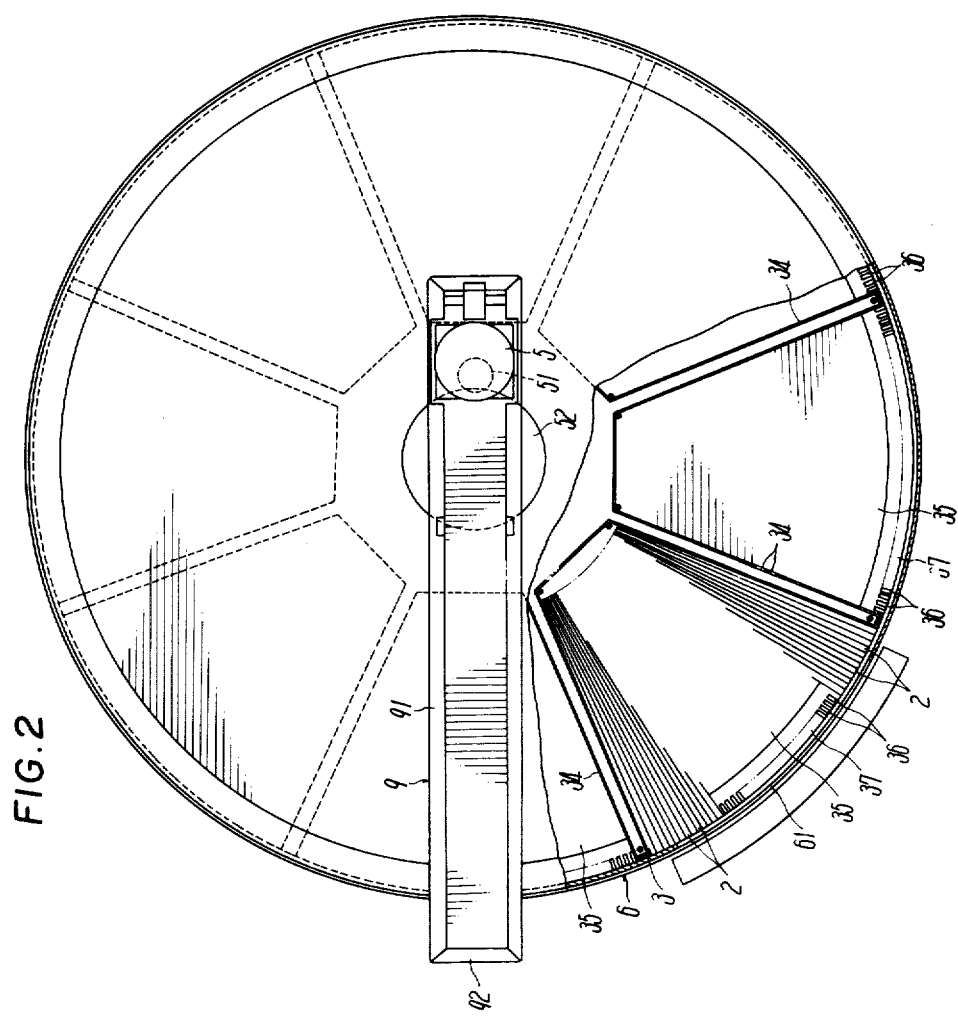

The base 1, as shown in FIGS. 1 and 2, provides a support member 9 comprising a first member 91 extending horizontally and supported revolvably to the center pillar 11 and a second member 92 extending vertically and connecting with the first member 91, the first member 91 carrying the driving device 5, the second member 92 carrying the selection device 4.

In greater detail, the base 1 comprises a pair of round base plates 12 and 13 opposite to each other at a fixed interval and connected with each other at the centers by the tubular center pillar 11, around which the reel 3 is supported rotatably through a pair of thrust bearings $S_1$ and $S_2$. The center pillar 11 projects at its upper end upwardly from the upper base plate 13 and fixes at the projection a stationary gear 52 engageable with a drive gear 51 at the driving device 5. The stationary gear 52 carries therein a bearing 10 to revolvably support the root of first member 91, and the second member 92 is connected vertically downwardly to a free end of first member 91 and opposite to the outer periphery of reel 3 so that the driving device 5 mounted on the first member 91 drives the selection device 4 mounted on the second member 92 to revolve along the outer periphery of reel 3.

At the circumferentially edges of base plates 12 and 13 at the base 1 are provided ring-shaped holders 6 which project opposite to each other, thereby preventing the files 2 from carelessly escaping from the reel 3.

Incidentally, the holders 6 in this embodiment each have a cutout 61 for insertion or taking out of each file 2. Alternatively, one holder 61 may be provided at the base plate 12 or 13.

The reel 3 comprises a round upper plate 32, a round lower plate 31, and a cylinder 33 connecting the upper and lower plates 32 and 31 at a fixed interval, and is divided into a plurality of file accommodating rooms 35 by use of a plurality of partitions 34 each of an about U-like shape in section as shown in FIG. 2. The upper plate 32 and lower plate 31 are provided at the outer peripheral portions with positioning plates 37 having a number of grooves 36 juxtaposed circumferentially of each plate 37 at regular intervals to thereby position each file 2. Alternatively, a plurality of reels 3 may be layered and have the selection devices 4 respectively or a vertically movable one in common.

The files 2 each mainly have the back provided with the codes 2a and a search lever 2b as the searching display means. The selection device 4 comprises a reader 41 for reading the codes 2a on the files 2 and an actuator 42 for electrically actuating the lever 2b.

In detail, the files 2, as shown in FIGS. 3 and 4, each comprise a file body 21 accommodating therein a plurality of sheets of paper and a side-edge member 22 fixed on one side of file body 21, the side-edge member 22 being formed of, for example, a flat strip of synthetic resin and having the back coming out rearwardly from the file body 21 so that the back bears the codes 2a and the side-edge member 22 provides the file search display means of search lever 2b movable into or out of the back.

The search lever 2b comprises a root 1 having a pin bore, a searching portion or search nose m at one side of the root 1, and a display portion of display tongue n, the root 1 being pivoted to the side-edge member 22 at the lengthwise center thereof through a pin p, the search nose m being positioned below the root 1, the display tongue n being positioned above the same, so that the display tongue n, when the search nose m is given no input, i.e., during no file searching operation, is gravitated to be kept in the retreat position a inside the back of side-edge member 22 with respect to the vertical line x passing through the axis of swinging motion of lever 2b, thereby preventing the lever 2b from moving out of the back carelessly by the centrifugal force from the rotation of reel 3. On the other hand, when the file search is performed by the selection device 4, an input therefrom is given into the search nose m to swing the search lever 2b, thereby forcibly moving the display tongue n out of the back of side-edge member 22 to keep the lever 2b in the display position b.

The codes 2a are formed in such a manner that, for example, at the back of side-edge member 22 are disposed a large number of slits 23 lengthwise of the back at regular intervals so that a large number of thin code-pieces 24 are formed, the code-pieces 24 each being bent to either side widthwise of the side-edge member 22 so as to be easily cut off. In addition, the back of side-edge member 22 reflects the light from portions forming the codes 2a.

The side-edge member 22 as shown in FIG. 4, is provided at the inside edge with a plurality of hooked portions 25 disposed lengthwise thereof at the predetermined intervals and at both vertical ends with positioning noses 26 and 27 to be fitted into the positioning grooves 36 provided at the positioning plate 37 to thereby keep the accommodated files 2 in position respectively.

Each file body 21, as shown in FIGS. 3 and 4, is formed of, for example, a rectangular cardboard bent in M-like-shape and comprises a front cover 21a, a back cover 21b and a spine 21c of about V-like shape in section and for connecting the front and back covers 21a and 21b. The side-edge member 22 is inserted into a recess outside the spine 21c and engages at the hooked portions 25 with retainers c mounted on the spine 21c, thereby being attached detachably to each file 22. Each file body 21 has a cutout 21d at the portion opposite to the search lever 2b and avoids direct contact of the swinging lever 2b with the file body 21, and has at the spine 21c a binder (not shown) to bind a plurality of sheets. Alternatively, the file body 21 may be formed in a sack open at one side and carry the side-edge member 22. Also, the side-edge member 22 may be fixed to the file body 21 by a fixing means, such as adhesion.

Next, the selection device 4, shown in FIGS. 1 and 5, comprises the reader 41, the actuator 42, and a microcomputer 43 having a memory 43a and a comparator 43b, so that a selection signal from a keyboard 44 is given to the memory 43a and a memory signal outout therefrom is given to the comparator 43b. On the other hand, a read signal from the reader 41 is given to the comparator 43b through an amplifier, so that the comparator 43b compares the given memory signal and read signal, and then outputs a comparison signal when the memory signal coincides with the read signal. The actuator 42 is given the comparison signal and actuated to operate the search lever 2b. The reader 41 uses a reflex photosensor comprising a plurality of luminescent elements emitting photoelectrons toward the codes 2a and a plurality of light-sensitive elements receiving the reflected light from the luminescent elements, the actuator 42 employing a solenoid. The reader 41, actuator 42, microcomputer 43, keyboard 44 and driving device 5, connect with each other and to a power source by use of a conductor, the keyboard 44 connecting with a display unit 45 by which the selection signal from the keyboard 44 is converted into a digital signal and displayed.

Now, referring to FIGS. 1, 6 and 7, a control device 8 for controlling the driving device 5 of its normal or reverse rotation is provided between the base 1 and the support member 9, comprises a pair of photosensors 81 and 82 for emitting photoelectrons and a shade 83 of a given length for intercepting the photoelectrons emitted from the photoelectrons 81 and 82, the photosensors 81 and 82 being provided at the second member 92 and the shade 83 at the upper base plate 13 of the base 1, so that a detection signal is output from the photosensor 81 or 82 only when the shade 83 intercepts the photoelectron emitted from the photosensor 81 or 82, and is counted by a counter. The control device 8, which is set to count three for one revolution of selection device 4, outputs a control signal at the count three and feeds the control signal to the driving device 5 to thereby automatically stop it. Then, upon closing a switch for the driving device 5, it drives the selection device 4 in the reverse direction. Hence, the condutor connecting the driving device 5, selection device 4 and power source, is prevented from twisting to be cut.

Also, referring to FIGS. 6 and 7, a pair of safety covers 84 extending toward the reel 3 are pivoted to the second member 92 at the support member 9, a pair of springs (not shown) for biasing the covers 84 to move outwardly are interposed between the covers 84 and the second member 92, and a pair of limit switches 85 are provided thereon, so that when the worker contacts at his hand with either cover 84 during the operation of driving device 5, the cover 84 in contact swings to operate the limit switch 85 to thereby automatically stop the driving device 5, thus preventing the worker's hand from being caught between the second member 92 and the reel 3.

In addition, in FIG. 1, reference numeral 86 designates a X-like shaped leg attached to the lower end of center pillar 11, 87 designates a condenser, 88 designates a guide roller provided at the upper plate 32, 89 designates a guide roller at the first member 91, and 30 designates a guide roller at the second member 92.

Next, explanation will be given on operation of the file search apparatus of the invention.

For searching a desired file 2, No. of keyboard 44 corresponding to the code 2a for the desired file 2 is selected and the selection signal is given to the microcomputer 43 from the keyboard 44. The reader 41 at the selection device 4 emits photoelectrons to the codes 2a on each file 2 and then the driving device 5 is operated to allow the selection device 4 to revolve along the outer periphery of reel 3 through the support member 9, at which time the reader 41 reads the codes 2a on each file 2 accommodated in the reel 3 and outputs a read signal so that, when the read signal coincides with the selection signal, the microcomputer 43 outputs a comparison signal to actuate the actuator 42, whereby the search lever 2b at the desired file 2 is moved by the actuator 42 to project outwardly, thus completing the desired file search. Incidentally, the driving device 5, after the selection device 4 once revolves around the reel 3, automatically stops by virtue of a control signal output from the control device 8.

After the completion of file search and the stop of driving device 5, the desired file is taken out through the take-out cutouts 61 at the holders 6. If the searched file 2 is not positioned corresponding to the cutouts 61, the reel 3 is rotated by hand and the file 2 reaches the cutouts 61 to be taken out therethrough. Therefore, the searched file 2 can be taken out easily only by rotating the reel 3 and any extra space for looking for the searched file 2 is not necessary.

Also, the driving device 5 which is extremely small-sized is usable to drive the selection device 4 for the file search, resulting in that the apparatus of the invention has a lower initial cost and running cost and also is lightweight as a whole.

Furthermore, the searched file 2 is displayed only by swinging motion of search lever 2b, which is quite free from a contact resistance between the files 2, thereby always ensuring the complete file search.

Alternatively, instead of the holders 6, a file holder 38 at the reel 3 and an engaging portion 39 at each file 2 may be provided as shown in FIGS. 8 through 10. In detail, a file positioning plate 37a is provided at the outer-peripheral portion of lower plate 31 at the reel 3, a number of file positioning grooves 36a are formed at the radially outward end of the plate 37a circumferentially thereof at regular intervals, a ring-shaped file holder 38 having an upwardly stepped portion 38a provided radially inwardly of the grooves 36a, and the engaging portion 39 downwardly extending is provided at the lower end of each side-edge member 22 inwardly of the positioning nose 27, whereby the engaging portion 39 engages with the stepped portion 38a to restrict the file 2 from moving outwardly, and rides over the stepped portion 38a when taking out each file 2. Alternatively, the engaging portion 39, not shown, may be grooved at the lower edge of each file 2 and the file holder 38 may be formed in an upward projection engageable with the same.

Thus, the file 2 can be inserted in or taken out of the reel 3 in any position.

Alternatively, the selection device 4, as shown in FIGS. 8 through 10, may be provided with an association member 7 operating after a desired file is searched, and the reel 3 may be provided at the outer periphery with a plurality of engaging members 70 engageable with the association member 7, so that the reel 3, after the desired file is searched, rotates in association with the selection device 4 to automativally bring the searched file 2 to the termination of revolution of selection device 4.

In detail, the respective partitions 34 of about U-like shape in section at the reel 3 are connected at the outer ends through a plate 34a carrying the engaging member 70. The association member 7 at the selection device 4, as shown in FIGS. 9 and 11 through 13, has an actuator 72 which advances or retreats radially of the reel 3 through a pair of guides 71, the actuator 72 being biased to retreat by a spring 73 and pivotally supporting, at the end opposite to the engaging member 70, a pair of pawls 74 whose tips are opposite to each other at the largest interval slightly larger than a lateral width of engaging member 70 and which are swingable to reduce the interval and biased to move away from each other by a pair of springs 75. A mountain-shaped arm 76 is pivoted at the intermediate portion to a stem connecting the upper portions of guide 71, at the lower end to the rear of the actuator 72, and at the upper end to one end of a vertically operative rod at a solenoid 77, so that the operative rod advances or retreats by the solenoid 77 to move the actuator 72 through the arm 76 away from or toward the engaging member 70 by virtue of or against the spring 73. Then, the selection device 4 keeping the advanced actuator 72 revolves in the direction of the arrow in FIG. 13 so that the pawl 74 in front hits the engaging member 70 and falls down. Therefore, the engaging member 70 enters between the pawls 74 as shown in the two-dot chain line and then is pushed by the rear pawl 74, thus allowing the reel 3 to rotate.

Figure 11:
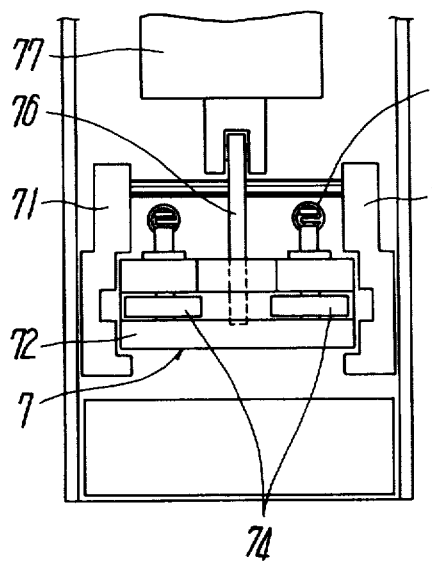
Figure 12:
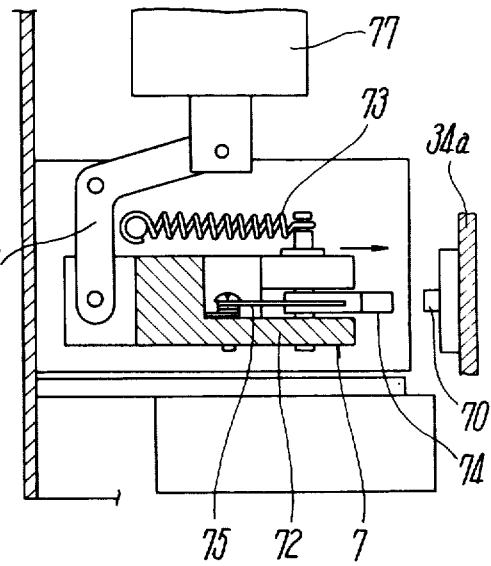
Figure 13:
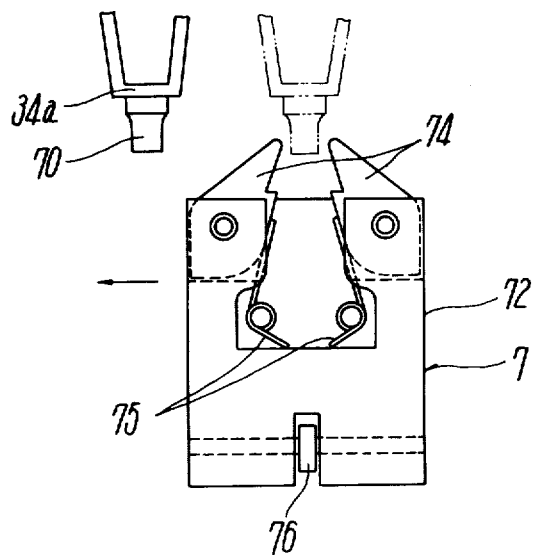

In addition, the solenoid 77, not shown in detail, supplies to its yoke magnetic flux superposed by an electromagnetic coil and a permament magnet so that the electromagnetic coil is deenergized during the operation for file search, thereby advancing the operation rod at the solenoid 77 by the spring 73 as shown in FIGS. 11 and 12. After the lapse of a fixed time period since the actuator 42 at the selection device 4 is energized to actuate the search lever 2b, one positive pulse is given into the electromagnetic coil from the operative electric circuit at the selection device 4 so as to attract the operative rod and hold it by the permanent magnet, and one negative pulse is given to the electromagnetic coil from the above electric circuit to advance the operative rod and hold it by the spring 73.

The reason for attracting the operative rod at the solenoid 77 after the lapse of the predetermined time period is that even when the desired file 2 is positioned in proximity to and before or behind one engaging member 70 in the rotating direction of reel 3, the second member 92 having the selection device 4 passes the proximate engaging member 70 without engaging with the engaging member 70 through the actuator 72 to thereby avoid covering the searched file 2 by the second member 92. Hence, the actuator 72 engages with the next engaging member 70, thus reliably taking out the desired file.

Accordingly, the desired file 2, after searched by the selection device 4, moves automatically to reach the position accessible by the worker, thereby readily and reliably taking out the desired file 2 without manual operation to rotate the reel 3.

As seen from the above, the file search apparatus of the invention, in any embodiment, can simply take out a desired file always at the fixed position without looking for it and also requires no extra space for file search around the reel to thereby save an installation space for the apparatus even when accommodating a large number of files.

Although the invention has been described with reference to several different embodiments, these embodiments are merely exemplary and not limiting of the invention which is defined solely by the appended claims.

What is claimed is:

1. A file search apparatus comprising a base having a center pillar, a large number of files having respective codes thereon, a reel having compartments for accommodating therein said files juxtaposed in a circle and being supported to said pillar by means permitting free rotation therearound, a selection device which is supported to said base by means permitting it to rotate about the outer periphery of said reel, said selection device reading said codes at said files to search for one of said files, a driving device for driving said selection device about the outer periphery of said reel, and a search display means for displaying said file searched by said selection device.

2. A file search device according to claim 1, wherein each of said files comprises a file body and a side edge member which has a back and is provided at a portion of said back with said codes and a search lever movable in or out with respect to said back and for displaying said searched file, said selection device being provided with a reader for reading said codes at said files and an actuator which is responsive to an output from said reader to electrically operate so as to allow said lever to move out with respect to said back.

3. A file search apparatus according to claim 2, wherein said files each comprise a file body and a side-edge member, said side-edge member providing at the back thereof said codes and supporting said search lever movably in or out with respect to said back.

4. A file search apparatus according to claims 2 or 3, wherein said search lever comprises a mounting root, a searching portion extending from one side of said root, and a display portion extending from the other side of said root, said root being supported swingably by a pin, said display portion being positioned inside the back at each of said files with respect to a vertical line passing through an axis of swinging motion of said lever.

5. A file search apparatus according to claim 2, wherein said actuator at said selection device is a solenoid.

6. A file search apparatus according to claim 2, wherein said codes at said files each have a light reflection surface, said reader at said selection device having a reflex photosensor.

7. A file search apparatus according to claim 1, wherein said base is provided with a support member comprising a first member horizontally extending and supported freely revolvably to said center pillar and a second member vertically extending and coupled with said first member, said first member carrying said driving device, said second member carrying said selection device.

8. A file search apparatus according to claim 7, wherein said second member is provided with safety covers made swingable with respect to said second member and with a limit switch which operates upon swinging motion of said cover and stops said driving device.

9. A file search apparatus according to claim 1 further comprising a control device which controls said driving device in normal and reverse rotations fo that said selection device is allowed to revolve alternately in the normal and reverse directions between one initial position and one terminus position.

10. A file search apparatus according to claim 9, wherein said selection device has an association member actuated after searching for a said file, said reel being provided at the outer periphery thereof with a plurality of engaging members each engageable with said association member, so that after said selection device searches one of said files, said reel is rotated in association with said selection device, thereby positioning said search file at the terminus of revolution of said selection device.

11. A file search apparatus according to claim 1, wherein said base is provided with holders for restraining said files accommodated in said reel from moving outwardly therefrom.

12. A file search apparatus according to claim 1, wherein said reel has an upper plate, a bottom plate and means connecting said upper and bottom plate with a fixed spacing, the outside of the bottom plate having a file holding portion which has an upwardly stepped portion, said files each having an engaging portion which engages with said stepped portion to restrain said file from moving outwardly and can ride over said stepped portion when each of said files is taken out of said reel.

* * * * *